United States Patent [19]

Palmer

[11] 4,113,072
[45] Sep. 12, 1978

[54] PISTON VALVE ASSEMBLY FOR A SHOCK ABSORBER

[75] Inventor: Dale A. Palmer, Monroe, Mich.

[73] Assignee: Monroe Auto Equipment Company, Monroe, Mich.

[21] Appl. No.: 829,954

[22] Filed: Sep. 1, 1977

Related U.S. Application Data

[63] Continuation of Ser. No. 668,915, Mar. 22, 1976, abandoned, which is a continuation-in-part of Ser. No. 542,617, Jan. 20, 1975, Pat. No. 3,945,474.

[51] Int. Cl.² ............................................. F16F 9/34
[52] U.S. Cl. .................................. 188/282; 137/493.8; 188/322
[58] Field of Search ............... 188/280, 282, 313, 317, 188/322; 137/493.8

[56] References Cited

U.S. PATENT DOCUMENTS

| | | | |
|---|---|---|---|
| 2,346,275 | 4/1944 | Reed et al. | 188/317 |
| 2,467,098 | 4/1949 | Rossman | 137/493.8 |
| 2,472,840 | 6/1949 | Lewton | 188/322 |
| 2,719,612 | 10/1955 | DePrevinquieres | 188/317 |
| 3,007,550 | 11/1961 | Long | 188/322 |
| 3,088,556 | 5/1963 | DeCarbon | 188/322 |

Primary Examiner—Edward R. Kazenske
Attorney, Agent, or Firm—Harness, Dickey & Pierce

[57] ABSTRACT

A shock absorber of the direct acting hydraulic type is disclosed as comprising a reciprocable piston having a piston body, the piston body being formed with first and second sets of spaced flow ports, the sets of flow ports being concentrically oriented with the first set being spaced radially inwardly from the second set; a first valve seat on one end of the piston body adjacent the first set of flow ports; a first valve member engageable with the first valve seat to block fluid flow through the first set of flow ports; first and second sequentially operable springs for resiliently urging the first valve member toward the first valve seat; second and third valve seats on the opposite end of the piston body and located radially inwardly and outwardly from the second set of flow ports; a second valve member in the form of a flat annular valve disc disposed adjacent the second and third valve seats and engageable therewith to block fluid flow through the second set of flow ports; the ends of the second set of flow ports confronting the second valve member terminating in enlarged size recesses, the area of which is in a predetermined ratio to the cross sectional area of the second set of flow ports.

9 Claims, 7 Drawing Figures

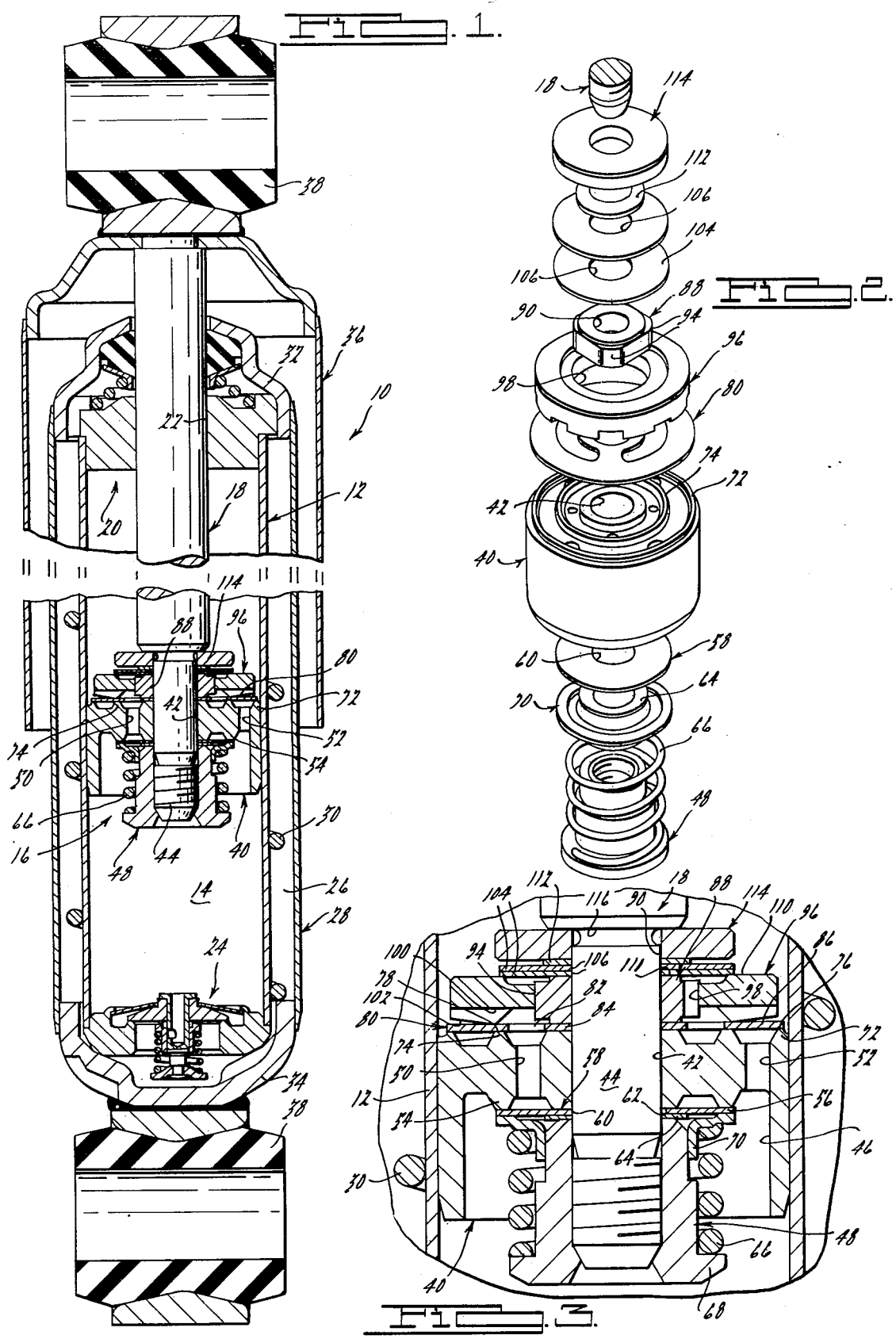

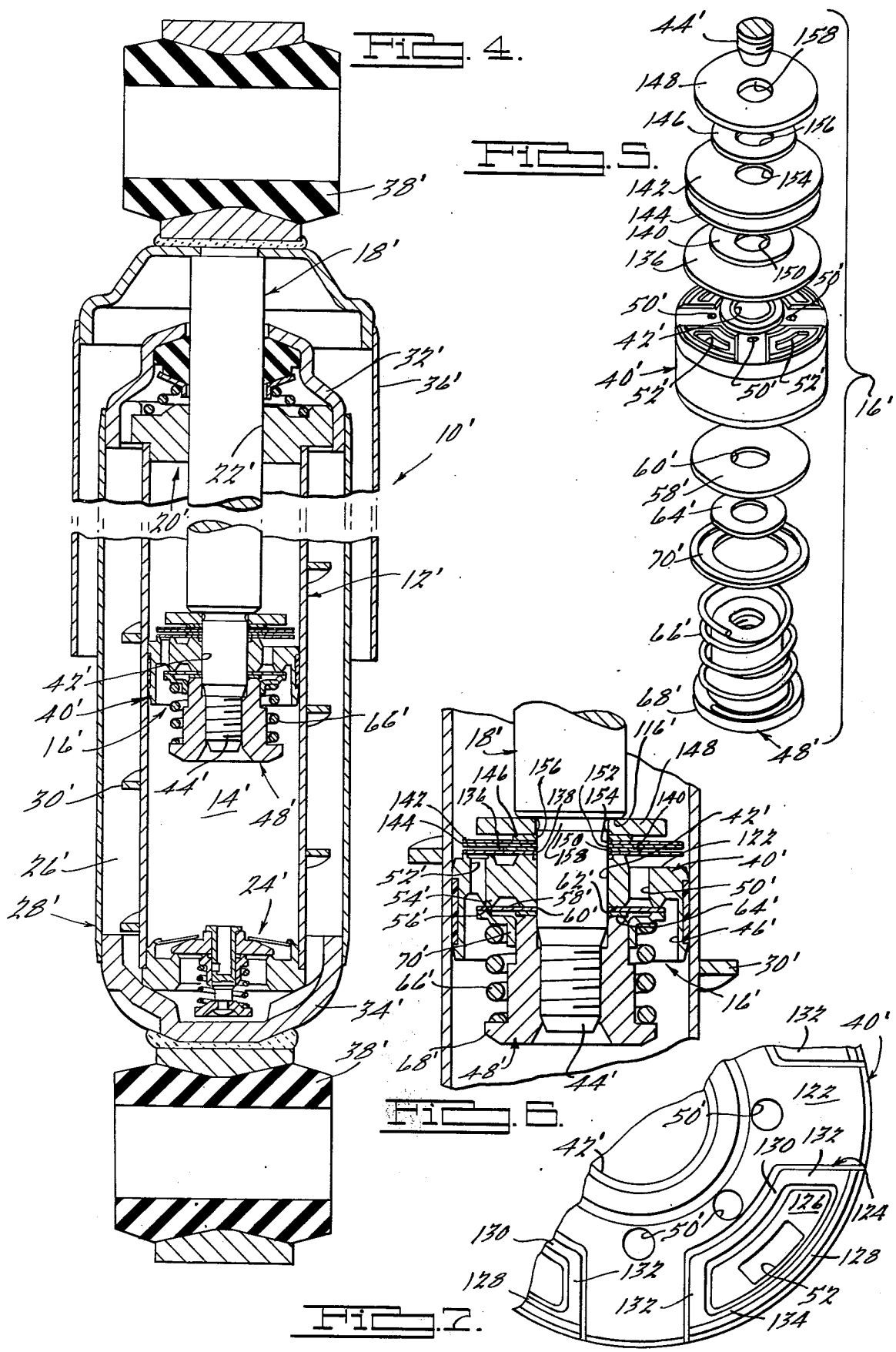

4,113,072

PISTON VALVE ASSEMBLY FOR A SHOCK ABSORBER

RELATED APPLICATIONS

This application is a continuation of Ser. No. 668,915 filed Mar. 22, 1976, now abandoned, which is a continuation-in-part of Ser. No. 542,617 filed Jan. 20, 1975, now U.S. Pat. No. 3,945,474.

SUMMARY OF THE INVENTION

This invention relates generally to vehicular shock absorbers and, more particularly, to a new and improved piston construction for direct acting telescopic shock absorbers.

It is accordingly a general object of the present invention to provide a new and improved shock absorber construction.

It is a more particular object of the present invention to provide a new and improved shock absorber construction which embodies a novel full displacement piston design therein.

It is yet a more particular object of the present invention to provide a new and improved shock absorber piston construction which utilizes multiple springs for controlling fluid flow through the piston flow ports under various operating conditions.

It is another object of the present invention to provide a new and improved shock absorber piston construction of the above-described type wherein a first magnitude of fluid flow through the piston is controlled by the spring force embodied in the piston valve member and a second magnitude of fluid force is controlled by a second spring located adjacent the piston valve member.

It is another object of the present invention to provide a new and improved shock absorber piston construction of the above-described type which may utilize different spring forces in the valving design so as to provide for universality of application.

It is yet another object of the present invention to provide a new and improved full displacement shock absorber piston construction wherein the compression flow ports terminate in enlarged size recesses, the dimensions of which are in a predetermined ratio to the size of the ports.

It is a further object of the present invention to provide a new and improved shock absorber piston construction which is of a relatively simple design, is economical to manufacture, and will have a long and effective operational life.

Other objects and advantages of the present invention will become apparent from the following detailed description taken in conjunction with the accompanying drawings.

BRIEF DESCRIPTION OF THE DRAWINGS

FIG. 1 is a longitudinal cross-sectional view of a vehicle shock absorber incorporating the new and improved piston construction of the present invention;

FIG. 2 is an elevated perspective exploded view of the piston construction embodying the principles of the present invention;

FIG. 3 is an enlarged cross-sectional view of the piston construction shown in FIGS. 1 and 2;

FIG. 4 is a longitudinal cross-sectional view similar to FIG. 1 of an alternate embodiment of the shock absorber piston construction of the present invention;

FIG. 5 is an elevated perspective view of the piston construction shown in FIG. 4;

FIG. 6 is an enlarged cross-sectional view of the piston construction shown in FIGS. 4 and 5; and FIG. 7 is an enlarged fragmentary top elevational view of the piston body incorporated in the shock absorber shown in FIG. 4.

DETAILED DESCRIPTION OF A PREFERRED EMBODIMENT

Referring now in detail to the drawings and in particular to FIG. 1 thereof, a tubular direct acting hydraulic shock absorber 10 is shown as comprising an elongated tubular pressure cylinder 12 defining a hydraulic fluid containing working chamber 14. Disposed within the chamber 14 is a reciprocable piston 16 that is secured to one end of an axially extending piston rod 18. The piston rod is supported and guided for movement within the pressure cylinder 12 by means of a combination fluid seal and rod guide assembly 20 located in the upper end of the cylinder 12 and having a central axially extending bore 22 through which the piston rod 18 extends. A base valve, generally designated by the numeral 24, is located within the lower end of the pressure cylinder 12 and functions to control hydraulic fluid communication between the working chamber 14 and a fluid reservoir 26 that is defined between the outer periphery of the cylinder 12 and the inner periphery of a tubular reserve tube 28 which is arranged concentrically around the exterior of the pressure cylinder 12. The construction and operation of the base valve may be of the type shown and described in U.S. Pat. No. 3,771,626, which patent is incorporated by reference herein. As is conventional in the art, a helical baffle 30 is provided within the fluid reservoir 26 for controlling aeration of the hydraulic fluid transferred between the reservoir 26 and the working chamber 14. The upper and lower ends of the shock absorber 10 are provided with generally cup-shaped upper and lower end caps 32 and 34, respectively, which are secured, as by welding, to the opposite ends of the reserve tube 28 as illustrated. The shock absorber 10 is shown as being provided with a dirt shield 36 which is secured at its upper end to the upper end of the piston rod 18, and suitable end fittings 38 are secured to the upper end of the piston rod 18 and the lower end cap 34 for operatively securing the shock absorber 10 between the sprung and unsprung portions of an automotive vehicle. As will be appreciated by those skilled in the art, upon reciprocal movement of the piston rod 18 and piston 16 carried thereon, hydraulic fluid within the chamber 14 will be transferred between the upper and lower ends of the cylinder 12 and between the chamber 14 and the fluid reservoir 26, whereby to dampen relative movement between the sprung portion of the associated vehicle and the unsprung portion thereof. Toward this end, the piston 16 is provided with a new and improved valving arrangement for selectively controlling the flow of hydraulic fluid between the upper and lower ends of the chamber 14 during reciprocal movement thereof, as will hereinafter be described in detail.

In accordance with the principles of the present invention, the shock absorber piston 16 comprises a generally cylindrically-shaped piston body 40 that is formed with a central axially extending bore 42 within which a reduced diameter end portion 44 of the piston rod is received. The lower or underside of the piston body 40 is formed with an enlarged diameter recess or counterbore 46 within which a threaded nut or similar type fastening element 48 is threadably received upon the end portion 44 to retain the piston body 40 upon the piston rod 18. The piston body 40 is formed with first and second sets of axially extending circumferentially spaced flow ports 50 and 52, with each of the sets of flow ports 50 and 52 preferably comprising four circumferentially spaced ports and with the second set of ports 52 being spaced radially outwardly from and concentrically arranged relative to the first set of flow ports 50. Disposed within the counterbore 46 and extending axially downwardly therewithin is an annular lower valve seat 54 which is spaced radially outwardly from the inner set of flow ports 50 and radially inwardly from the outer set of flow ports 52. The valve seat 54 defines a generally radially extending seating surface 56 which is adapted to be selectively engaged by the upper side of a generally disc-shaped valve member 58. The valve member 58 is formed with a central opening 60 through which the lower end portion 44 of the piston rod 18 extends. The inner periphery of the valve disc 58 is adapted to be fixedly retained or secured to the piston body 40 by being clampingly secured between an annular shoulder 62 on the body 40 and a spacer washer 64, the latter of which bears directly against the upper end of the threaded nut 48. A helical coil spring 66 is arranged concentrically of the nut 48 and is supported at the lower end thereof by a radially outwardly extending flange 68 on the lower end of the nut 48. The upper end of the spring 66 bears against a spring retainer 70 which in turn acts against the underside of the valve disc 58, whereby to resiliently urge the valve disc 58 into sealing engagement with the seating surface 56 of the valve seat 54. As will be appreciated by those skilled in the art, at such time as the piston body 40 moves upwardly within the working chamber 14 of the pressure cylinder 12, fluid will flow downwardly through the inner set of flow ports 50, thereby forcing the outer periphery of the valve disc 58 downwardly against the resistance of the spring 66, whereby fluid may flow from the flow ports 50, between the seating surface 56 and the upper side of the valve disc 58 into the lower end of the working chamber 14.

As best seen in FIG. 3, the upper end of the piston body 40 is formed with a pair of concentrically oriented axially upwardly extending annular valve seats 72 and 74, the former of which extends around the outer periphery of the upper end of the piston body 40 at a position radially outwardly from the outer set of flow ports 52. The valve seat 74 is disposed generally axially above the aforedescribed valve seat 54 and extends axially upwardly from the piston body 40 at a position spaced radially inwardly from the flow ports 52. The valve seats 72, 74 define generally radially disposed seating surfaces 76 and 78, respectively, which are adapted to be selectively sealingly engaged by means of a generally flat valve disc 80 that is disposed directly above the piston body 40, as seen in FIG. 3. The valve disc 80 is preferably fabricated of a suitable spring steel material and, as seen in FIG. 2, is formed with a generally C-shaped or circumferentially extending slot or flow passage 82 which extends almost entirely, but not completely, around the valve disc 80 and separates the disc 80 into radially inner and outer peripheral portions 84 and 86, respectively. The radially inner portion 84 of the valve disc 80 is formed with a suitable opening through which the piston rod end portion 44 extends for retaining the valve disc 80 in its operative position relative to the piston body 40. The radially outer portion 86 is adapted to bear upon or engage the valve seating surfaces 76, 78 and thereby block fluid flow from the ports 52 into the upper end of the chamber 14, as will later be described.

Disposed directly above the valve disc 80 is a valve guide member 88 which is formed with a central bore 90 through which the piston rod end portion 44 extends. As seen in FIG. 2, the valve guide 88 is generally square in transverse cross section and has the various corners thereof partially rounded off so as to define four circumferentially spaced contact points, generally designated by the numeral 94. Disposed radially outwardly from the guide member 88 and extending therearound in the general radial plane thereof is a compression plate, generally designated by the numeral 96, which is formed with a central opening 98. The diameter of the opening 98 is approximately equal to and slightly larger than the diagonal dimension of the valve guide member 88, whereby the compression plate 96 is axially slidable or movable relative to the guide member 88 and is guided for such movement by the contact points 94. The underside of the compression plate 96 is formed with a plurality of circumferentially spaced, radially inwardly extending and axially upwardly projecting notches or recesses 100, which are preferably although not necessarily eight in number, and which permit fluid flow communication between the flow passage 82 and the upper end of the working chamber 14. The underside of the compression plate 96 is relieved radially upwardly and outwardly at an angle of approximately 2°, as indicated in a somewhat exaggerated fashion at 102 in FIG. 3. It will be seen best in FIG. 3 that the lowermost portion of the plate 96 bears against the upper side of the valve disc 80 at a position directly axially above the valve seat 74, whereby the radially innermost part of the disc portion 86 is releasably retained in engagement with the surface 78; however, because of the upwardly and outwardly inclined surface 102, the underside of the plate 96 is spaced axially away from the upper side of the disc 80 at a position above the valve seat 72, thereby permitting the radially outer part of the disc portion 86 to deflect slightly upwardly away from the surface 76 under certain operating conditions of the shock absorber 10, as will hereinafter be described in connection with the overall operation of the piston 16.

Disposed directly above the valve guide member 88 and compression plate 96 is a pair of spring discs, generally designated by the numeral 104, which are formed with central coaxial bores 106 through which the end portions 44 of the piston rod 18 extends. The lower of the spring discs 104 bears directly against the upper side or surface 110 of the compression plate 96 and also against the upper surface 111 of the guide member 88. A suitable annular spacer member 112 is disposed directly above the spring discs 104 and an annular washer 114 is retained between the upper side of the spacer 112 and radial shoulder 116 formed at the juncture of the main portion of the piston rod 18 and a lower end portion 44 thereof. As will be apparent, the washer 114, spacer 112, spring discs 104, and guide member 88, as well as the piston body 40, are all retained upon the piston rod 18 by means of the threaded nut 48.

The spring discs 104 are adapted to yieldably resist upward movement of the compression plate 96 relative to the guide member 88, yet permits such upward movement of the compression plate 96 under certain operating conditions of the piston 16. The particular amount of resistance provided by the discs 104 can, therefore, be controlled by the number thereof and/or construction and material thereof. Although two of such discs 104 are shown and described in this application, the scope or fair meaning of the claims appended hereto are in no way intended to be limited to such a construction since one, two or more of such discs 104 could be used, depending upon the particular application and performance characteristics desired. Additionally, it will be noted that the axial thickness of the spacer 112 may be varied to control the amount of upward movement of the spring discs 104 and hence the amount of axial upward movement of the compression plate 96.

In operation of the shock absorber 10, the outer periphery of the valve disc 80 is normally engaged or seats upon the surfaces 76, 78 to block fluid flow through the flow ports 52. During low speed downward movement of the piston 16 within the working chamber 14, hydraulic fluid will pass upwardly through the flow ports 52 and deflects the outer periphery of the valve disc 80 upwardly to a position where it engages the inclined lower surface 102 of the compression plate 96, whereupon a predetermined magnitude of such fluid will thereafter pass into the upper end of the working chamber 14. At such time as the downward speed of the piston 16 exceeds a predetermined level, the hydraulic fluid flowing upwardly through the set of ports 52 will act to bias the outer peripheral portion 86 of the valve disc 80 upwardly and also cause the compression plate 96 to move upwardly against the resistance of the spring discs 104, whereupon a greater magnitude of fluid flow will occur between the underside of the valve disc 80 and the seating surface 76, 78, with the amount of resistance to such additional fluid flow depending upon the number and construction of spring discs 104. Thus, it will be seen that under low speed movement of the piston 16, a limited amount of fluid flow will occur between the outer seating surface 76 and the underside of the valve disc 80 since the outer periphery of the valve disc 80 will only move upwardly as far as the inclined or relieved surface 102 permits; however, at a greater rate of movement of the piston 16, the compression plate 96 itself will move upwardly, thereby permitting the outer peripheral portion 86 of the valve disc 80 to move entirely off from both the seating surfaces 76, 78 to permit the aforementioned greater magnitude of fluid flow. As previously mentioned, of course, at such time as the piston 16 moves upwardly within the pressure cylinder 12, i.e., during a rebound stroke or cycle, fluid will flow through the notches 100 and thereafter through the circumferentially extending flow passage 82 through the inner set of flow ports 50, whereupon the valve disc 58 will be displaced against the resistance of the coil spring 66 to permit fluid to flow from the upper end of the working chamber 14 to the lower end thereof.

It will be seen from the foregoing that the present invention provides a new and improved shock absorber piston construction wherein the magnitude of fluid flow, and hence the degree of shock absorber damping, is achieved through the use of multiple spring elements in the piston valving. By virtue of the fact that the construction and number of spring discs 104 may be easily varied, selective application of the shock absorber may be made without excessive costs for tooling, inventory, assembly, etc. Additionally, the subject piston design lends itself to the use of powdered or sintered metal techniques, since the guide member 88, compression plate 96, etc., may be so constructed, thereby significantly reducing the cost of the actual piston construction.

FIGS. 4–7 illustrate an alternate embodiment of the present invention and the various component parts thereof which are analogous to the aforedescribed shock absorber 10 which will be described and designated with like numerals having a prime suffix. As best seen in FIG. 4, a shock absorber 10′ is shown as comprising a pressure cylinder 12′ defining a hydraulic working chamber 14′. A piston assembly 16′ is located within the chamber 14′ and is secured to one end of a piston rod 18′. The rod 18′ is supported and guided for reciprocal movement within the cylinder 12′ by a fluid seal and rod guide assembly 20′ which defines a central bore 22′ through which the rod 18′ extends. A base valve assembly 24′ is located at the lower end of the cylinder 12′ and controls hydraulic fluid communication between chamber 14′ and reservoir 26′ which is defined between the cylinder 12′ and an exterior reserve tube 28′. A suitable anti-aeration baffle 30′ is disposed within the reservoir 26′. The upper and lower ends of the shock absorber 10′ are provided with end caps 32′ and 34′, respectively, and the shock absorber 10′ is provided with a dirt shield 36′, with suitable connecting fittings 38′ being mounted on the upper end of the piston rod 18′ and lower end cap 34′.

The piston assembly 16′ includes a piston body 40′ having a central bore 42′ within which the lower end 44′ of the piston rod 18′ is located. The lower side of the piston body 40′ includes a counterbore 46′ within which a connecting nut 48′ is located, the nut 48′ being threadably connected to the end portion 44′ of the piston rod 18′. The piston body 40′ is formed with first and second sets of axially extending circumferentially spaced flow ports 50′ and 52′, which sets of flow ports preferably comprise eight equally circumferentially spaced rebound ports 50′ and four equally circumferentially spaced compression ports 52′ spaced radially outwardly from and concentrically arranged relative to the ports 50′. Located within the counterbore 46′ is a downwardly extending valve seat 54′ spaced outwardly from the ports 50′ and defining a radially extending seating surface 56′ adapted to be engaged by the upper side of a disc-shaped valve member 58′. The valve member 58′ has a central opening 60′ and the inner periphery thereof is fixedly secured to the piston body 40′ by being clamped between shoulder 62′ and spacer washer 64′. Helical spring 66′ extends between a shoulder 68′ on the nut 48′ and a spring retainer 70′ which bears against the underside of the valve disc 58′. As best seen in FIGS. 6 and 7, the upper side of the piston body 40′ is formed with a top surface 122 in which four equally circumferentially spaced generally trapezoidal-shaped upwardly extending valve seats 124 are formed. Each of the valve seats 124 defines an interior valve chamber 126 which generally surrounds the upper end of the associated valve port 52′. As seen in FIG. 7, each of the valve seats 124 comprises a generally circumferentially radially outward section 128, a radially inner section 130 and a pair of radially extending end sections 132 which extend between the inner and outer sections 128, 130. The sections 128–132 of each of the valve seats 124 define a valve seating surface 134, all of which surfaces 134 lie in a common radially extending plane arranged perpendicular to the axis of the piston rod 18′. Disposed directly above the piston body is a generally flat valve disc 136, the lower side of which bears upon the valve seating surfaces 134 of the valve seats 124 to close the upper sides of the chambers 126 defined therein. The valve disc 136 is formed with a central opening 138 through which the piston rod section 44' extends, as illustrated. Disposed directly above the valve disc 136 is an annular spacer ring 140 and disposed directly above the ring 140 is a pair of spring discs 142 and 144. An annular spacer ring 146 is located directly above the spring discs 142, 144 and is analogous to the aforedescribed spacer ring 112 of the piston 40. An annular washer 148 is located above the spacer ring 146 and bears against the underside of a shoulder 116' defined by the piston rod 18'. The members 140–148 are all concentrically oriented relative to the axis of the piston rod 118' and are formed with central openings 150, 152, 154 and 158, respectively, through which the piston rod section 44' extends.

In operation of the shock absorber 10', the outer periphery of the valve disc 136 is normally engaged with the valve seating surfaces 134 defined by the plurality of valve seats 124, whereby to block fluid flow through the ports 52. During low speed downward movement of the piston 16', hydraulic fluid will pass upwardly through the ports 52' and deflect the outer periphery of the valve disc 136 upwardly away from the valve seating surfaces 134. At such time as the downspeed of the piston 16' exceeds a predetermined level, the hydraulic fluid flowing through the upward ports 52' will act to bias the outer periphery of the valve disc 136 upwardly to a position wherein the upper side thereof contacts the valve disc 144, which in turn results in upward deflection of the valve discs 142 and 144 along with the valve disc 136, with the resistance to flow through the ports 52' being determined by the construction, i.e., thickness in material, of the discs 142, 144 as previously discussed herein.

In accordance with the principles of the present invention, it has been determined that optimum performance of the shock absorber 10' is achieved when the sum of the cross-sectional areas of the flow ports 52' with respect to the sum of the cross-sectional areas of the chambers 126 is at a predetermined ratio. In particular, it has been determined that in order to prevent too harsh a ride, the cross-sectional size of each of the ports 52' should be at least 0.0045 square inches and that there should be at least three (but preferably four) of such of the flow ports 52', so as to provide a total minimum area of 0.0135 square inches of fluid flow during a compression cycle (downward movement of the piston as viewed in FIG. 4). It has also been determined that optimum performance is achieved when the cross-sectional area of each of the chambers 126 is approximately 0.0409 square inches so that the sum of the areas of the chambers 126 is 0.1227 square inches. Thus, the minimum ratio of flow port size to chamber size is 0.0135 to 0.1227, or 0.11.

Insofar as the maximum ratio of the cross-sectional size of the flow ports 52' with respect to the chambers 126, while in practice it may be possible to make the flow ports 52' is large in cross section as the chambers 126, so that the resultant ratio is 1:1, it is preferable from a manufacturing standpoint to have the size of the ports 52' somewhat smaller than the size of the chambers 126. A preferred maximum size of the ports 52' has been found to be 0.0103 square inches and it is preferred that there be a maximum of four such ports 52', with the result that the sum of the areas thereof is 0.412 square inches. Thus, the maximum ratio of the flow port size to chamber size is 0.0412 to 0.1636, or 0.25. It will be appreciated of course that the aforesaid ratios may be varied somewhat without departing from the scope of the present invention even though the aforesaid ratios have been found to be highly preferable from an operational and manufacturing standpoint.

It is to be noted that the shock absorber 10' exhibits certain advantages over the shock absorber 10 previously described herein in that a lesser number of parts is required in the piston 40'. Accordingly, greater manufacturing quality control may be maintained. An additional advantage of the piston assembly 40' resides in the fact that no holes or apertures need be provided in the valve disc 136 in order to provide for fluid communication to the flow ports 50'. Instead, fluid communication is provided by means of a plurality of radially disposed flow paths formed in the piston body between the valve seats 124. An additional advantage of the shock absorber construction 10' resides in the fact that when the chambers 126 are larger in cross sectional area than the flow port 52', a greater pressure area is provided adjacent the underside of the valve 136. Hence, the valve 136 may be fabricated of a lower rate spring material (such as spring steel) than would be the case if the chambers 126 were the same size as the ports 52'. Yet another advantage of the present invention as embodied in the shock absorber 10' resides in the fact that because the piston is of the full displacement type, i.e., the entire area of the piston is effective against the hydraulic fluid during reciprocal movement of the piston, lower pressures are created within the pressure cylinder 12' which in turn minimizes sealing problems and objectionable "fade" that is produced due to oil aeration.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:
1. A shock absorber piston construction comprising,
a piston body having means thereon connected to one end of an associated piston rod,
said piston body being formed with first and second sets of axially extending, circumferentially spaced flow ports,
said first set of flow ports being greater in number than said second set of flow ports and said second set of flow ports being spaced radially outwardly from said first set of flow ports,
a first annular axially extending valve seat being coaxial with said body on one side thereof adjacent said first set of flow ports,
a first valve member engageable with said first valve seat to block fluid flow through said first set of flow ports,
a plurality of circumferentially spaced valve seats on the opposite side of said piston body,
said plurality of valve seats defining radial flow paths therebetween which are communicable with said first set of flow ports,
said valve seats defining individual chambers at the ends of said second set of flow ports, each of said chambers being larger in cross-sectional area than the associated flow port terminating therein, with the sum of the cross-sectional areas of said cham- bers being of a predetermined ratio with respect to the sum of the cross-sectional areas of said second set of flow ports, a second valve member in the form of a flat annular valve disc extending radially of said body directly adjacent said plurality of valve seats and engageable therewith to block fluid flow through said second set of flow ports, said second valve member being movable between a first position permitting a first magnitude of fluid flow through said second set of flow ports and a second position permitting a second magnitude of fluid flow through said second set of flow ports, and at least one spring disc disposed on the axially opposite side of said second valve member from said piston body for resisting movement of said second valve member from said first position toward said second position.

2. The invention as set forth in claim 1 wherein each of said plurality of valve seats is generally trapezoidal shape.

3. The invention as set forth in claim 1 wherein said plurality of valve seats extend axially of said piston body and define valve seat surfaces which lie within a common imaginary plane extending at right angles to the axis of said piston body.

4. The invention as set forth in claim 1 wherein said second set of flow ports comprises at least three circumferentially spaced flow ports.

5. The invention as set forth in claim 1 wherein the minimum ratio of the sum of said cross-sectional areas of said second set of flow ports with respect to the sum of the cross-sectional areas of said chambers is approximately 0.11.

6. The invention as set forth in claim 5 wherein the maximum ratio of the sum of said cross-sectional areas of said second set of flow ports with respect to the sum of the cross-sectional areas of said chambers is approximately 0.25.

7. The invention as set forth in claim 1 wherein the ratio of the sum of the cross-sectional areas of said second set of flow ports which respect to the sum of the cross-sectional areas of said chambers is between slightly less than 1.0 and 0.11.

8. The invention as set forth in claim 1 wherein the ratio of the sum of the cross-sectional areas of said second set of flow ports with respect to the sum of the cross-sectional areas of said chambers is between 0.25 and 0.11.

9. The invention as set forth in claim 8 wherein said first set of flow ports comprises eight circumferentially spaced flow ports and wherein said second set of flow ports comprises four circumferentially spaced flow ports.

* * * * *